United States Patent
McCall et al.

(10) Patent No.: US 7,640,793 B2
(45) Date of Patent: Jan. 5, 2010

(54) SYSTEMS AND METHODS FOR DETERMINING AIRFLOW PARAMETERS OF GAS TURBINE ENGINE COMPONENTS

(75) Inventors: Thomas McCall, New Britain, CT (US); Kurt A Hassett, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 107 days.

(21) Appl. No.: 11/853,872

(22) Filed: Sep. 12, 2007

(65) Prior Publication Data

US 2009/0064773 A1 Mar. 12, 2009

(51) Int. Cl.
G01M 15/14 (2006.01)
(52) U.S. Cl. .................................. 73/112.01
(58) Field of Classification Search .......... 73/112.01, 73/112.03, 112.05, 112.06
See application file for complete search history.

(56) References Cited

U.S. PATENT DOCUMENTS

| | | | |
|---|---|---|---|
| 4,116,052 A * | 9/1978 | Paluka ................ 73/112.01 |
| 4,651,563 A * | 3/1987 | Zweifel ............... 73/112.01 |
| 5,092,942 A | 3/1992 | Fraser et al. |
| 5,549,767 A | 8/1996 | Pietruska et al. |
| 6,332,272 B1 | 12/2001 | Sinnott et al. |
| 6,370,752 B1 | 4/2002 | Anderson et al. |
| 6,687,596 B2 * | 2/2004 | Humerickhouse et al. ... 701/100 |
| 6,908,288 B2 | 6/2005 | Jackson et al. |
| 7,204,019 B2 | 4/2007 | Ducotey, Jr. et al. |
| 2006/0021427 A1 * | 2/2006 | Fleming et al. ............... 73/147 |
| 2007/0050064 A1 | 3/2007 | Burgess et al. |
| 2007/0084047 A1 | 4/2007 | Lange et al. |
| 2007/0113402 A1 | 5/2007 | Lutz et al. |

* cited by examiner

Primary Examiner—Eric S McCall
(74) Attorney, Agent, or Firm—Kinney & Lange, P.A.

(57) ABSTRACT

Systems and methods for determining airflow parameters of gas turbine engine components are provided. In this regard, a representative method includes: receiving information from multiple test systems regarding a first airflow parameter of a gas turbine engine component; and using the information to establish a desired performance parameter that is to be exhibited by a repaired component.

16 Claims, 2 Drawing Sheets

SYSTEMS AND METHODS FOR DETERMINING AIRFLOW PARAMETERS OF GAS TURBINE ENGINE COMPONENTS

BACKGROUND

1. Technical Field

The disclosure generally relates to gas turbine engines.

2. Description of the Related Art

Gas turbine engines require periodic inspections. Oftentimes, these inspections lead to the discovery of components that require repair. In this regard, repair of a gas turbine engine component typically is a labor-intensive endeavor that involves working with metals that can be difficult to dimensionally restore. Additional complexity is involved when the repaired components are expected to exhibit particular operating performance characteristics.

SUMMARY

Systems and methods for determining airflow parameters of gas turbine engine components are provided. In this regard, an exemplary embodiment of a system comprises an airflow analysis system operative to: receive information, from a first test system, corresponding to a first airflow parameter of a gas turbine engine component; receive information, from a second test system, corresponding to the first airflow parameter of the gas turbine engine component; and establish a reference value for the first parameter based, at least in part, on the information from the first test system and the information from the second test system.

An exemplary embodiment of a method comprises: receiving information from multiple test systems regarding a first airflow parameter of a gas turbine engine component; and using the information to discover a nominal performance parameter that is to be exhibited by a repaired component.

Another exemplary embodiment of a method comprises: receiving information, from a first test system, corresponding to a first airflow parameter of a gas turbine engine component; receiving information, from a second test system, corresponding to the first airflow parameter of the gas turbine engine component; and establishing a nominal value for the first parameter based, at least in part, on the information from the first test system and the information from the second test system.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods for determining airflow parameters of gas turbine engine components are provided, several exemplary embodiments of which will be described. In this regard, repair of gas turbine engine components is a technically challenging task that can be made even more difficult when expected operating characteristics of the components are not readily available. By way of example, a component such as a turbine vane can be restored to desired dimensional characteristics but information regarding airflow parameters of the turbine vane may not be known to those performing the repair. Notably, some embodiments can be used to acquire information corresponding to such airflow parameters, thereby facilitating proper repair of the component. In some embodiments, acquisition of such information is facilitated by a distributed network of test sites that can be used to acquire information regarding the same or different components. The information from the distributed network of test sites then can be compiled and analyzed so that nominal airflow parameters can be established for each component that is to be repaired.

Figure 1:
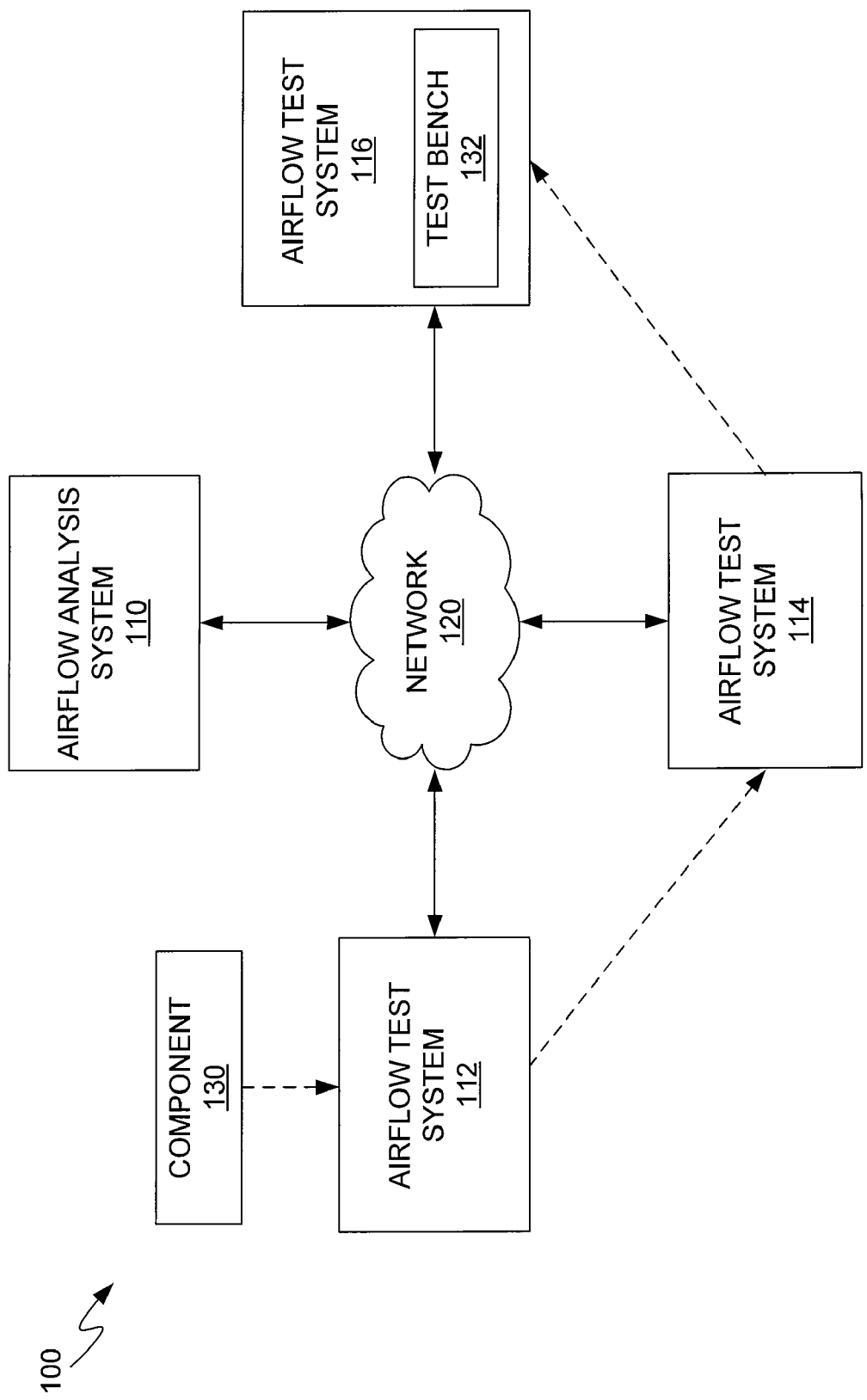
FIG. 1 is a schematic diagram depicting an exemplary embodiment of a system for determining airflow parameters of a gas turbine engine component.

Referring now in greater detail to the drawings, FIG. 1 is a schematic diagram depicting an exemplary embodiment of a system for determining airflow parameters of gas turbine engine components. As shown in FIG. 1, system 100 includes an airflow analysis system 110 that is configured to receive information from one or more airflow test systems. In particular, system 100 includes airflow test systems 112, 114 and 116, each of which is configured to communicate information to the airflow analysis system via communication network 120. Notably, network 120 can comprise one or more of various network types, such as wired networks, wireless networks, wide area networks (WANs), local area networks (LANs), virtual private networks (VPNs) and the Internet, for example.

In operation, a component 130 is tested by one or more of the test systems to determine one or more airflow parameters associated with the component. For instance the component can be either an un-repaired component or a repaired component (in which case information can be used to determine repair effectiveness, among other characteristics). By way of example, the component can be tested to determine a volumetric flow rate of cooling air that is provided to the component during engine operation. Notably, the cooling air can be used for film cooling the component.

In this regard, a test system can be configured to perform one or more of various tests, such as flow parameter and pressure ratio checks, for example. Notably, with respect to determining parameters associated with cooling airflow, an airflow test bench (e.g., test bench 132) can be used. Generally, such a test bench can include an airflow supply, analytical software, instrumentation and a tooling fixture that are employed to obtain information regarding the airflow parameters of a component.

Information regarding the airflow parameters is provided to the airflow analysis system for storage and analysis. Notably, the information can be stored in one or more of various formats, e.g., in a database format.

Using one or more analysis techniques, values useful for a repair operation can be calculated. Specifically, such values can include, but are not limited to, nominal values for one or more operating parameters, limit values for one or more operating parameters, and tolerance values. Once established, these values can be used during repair of a component similar to the component about which the information was acquired. It should be noted that calculated values can be revised based on later-acquired information. Thus, responsive to receipt of additional information corresponding to a component, one or more values can be adjusted based, at least in part, on this information. By way of example, additional information can be used to verify cooling hole size, location, angles and airflow necessary to ensure a sufficiently durable component.

Figure 2:
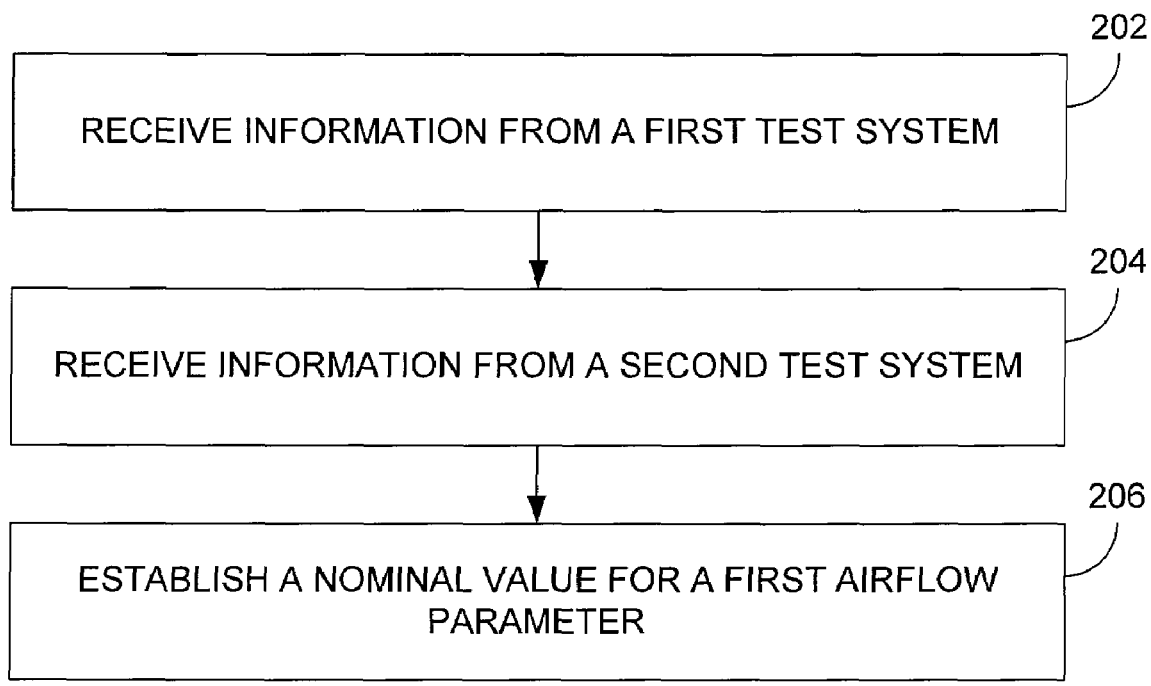
FIG. 2 is a flowchart depicting functionality of the embodiment of FIG. 1.

FIG. 2 is a flowchart depicting functionality of system 100. As shown in FIG. 2, the functionality (or method) may be construed as beginning at block 202, in which information from a first test system and corresponding to a first airflow parameter of a gas turbine engine component is received. In block 204, information is received from a second test system. Notably, this information corresponds to the first airflow parameter of the component. Then, as depicted in block 206, a nominal value for the first airflow parameter is established based, at least in part, on the information provided by the first and second test systems.

Figure 3:
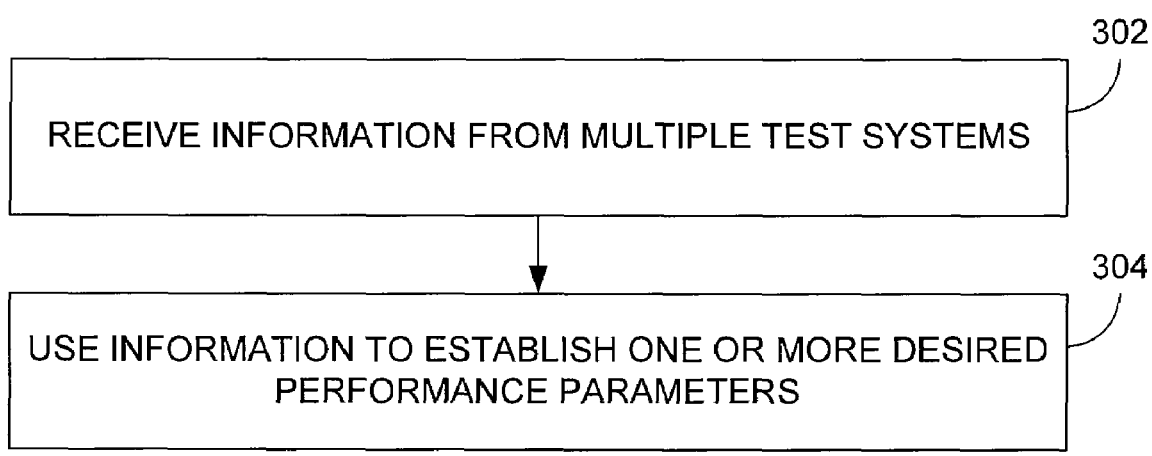
FIG. 3 is a flowchart depicting functionality of an exemplary embodiment of an airflow analysis system.

FIG. 3 is a flowchart depicting functionality of an embodiment of an airflow analysis system. As shown in FIG. 3, the functionality (or method) may be construed as beginning at block 302, in which information is received from multiple test systems. Specifically, the information corresponds to one or more airflow parameters of one or more gas turbine engine components. In this regard, multiple ones of the test systems could test the same component, in which case differences in the acquired information can be evaluated to determine remote system validity (such as in reference to system 112 of FIG. 1, for example). Additionally or alternatively, similar components (e.g., components of the same part number) can be evaluated by one or more of the test systems, in which case a nominal value(s) and tolerance value(s) for that component type can be established. In block 304, the information is used to establish one or more desired performance parameters that are to be exhibited by a repaired component. In some embodiments, the desired cooling necessary for engine operating environment can be determined. Additionally or alternatively, the information can assist in prescribing a flow method for the specific gas turbine component to follow during a repair process.

Various functionality, such as that described above in the flowcharts, can be implemented in hardware and/or software. In this regard, a computing device can be used to implement various functionality, such as that depicted in FIGS. 2 and 3.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or non-volatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for determining airflow parameters of a gas turbine engine component comprising:
    generating information, from a first test system, corresponding to a first airflow parameter of a gas turbine engine component;
    generating information, from a second test system, corresponding to the first airflow parameter of the gas turbine engine component; and
    establishing a nominal value for the first airflow parameter based, at least in part, on the information from the first test system and the information from the second test system,
    wherein the first test system comprises an airflow test bench, and
    wherein the information comprises test results associated with the airflow test bench.

2. The method of claim 1, further comprising:
    generating information, from a third test system, corresponding to the first airflow parameter of the gas turbine engine component; and
    adjusting the nominal value for the first airflow parameter based, at least in part, on the information from the third test system.

3. The method of claim 1, wherein:
    the second test system is located remotely from the first test system; and
    the method further comprises, after generating information from the first test system, sending the component for testing by the second test system.

4. The method of claim 1, wherein the first airflow parameter is a volumetric flow rate of cooling air used by the component during operation.

5. The method of claim 1, wherein the component is an un-repaired component.

6. The method of claim 1, wherein the component is a repaired component.

7. A method for determining airflow parameters of a gas turbine engine component comprising:
    receiving information from multiple test systems at an analysis system regarding a first airflow parameter of a gas turbine engine component, wherein the first airflow parameter is a volumetric flow rate of cooling air used by the component during operation; and
    using the information to establish a desired performance parameter that is to be exhibited by the component upon repair.

8. The method of claim 7, wherein using the information comprises repairing a second component such that the second component also exhibits the desired performance parameter of the component upon repair.

9. The method of claim 7, wherein receiving information from multiple test systems comprises receiving information corresponding to the same component from the multiple test systems.

10. The method of claim 7, wherein receiving information from multiple test systems comprises receiving information corresponding to multiple components having substantially identical part numbers from the multiple test systems.

11. The method of claim 7, wherein the component is an un-repaired component.

12. The method of claim 7, wherein the component is a previously repaired component.

13. The method of claim 7, wherein the component is a gas turbine engine component.

14. A system for determining airflow parameters of a gas turbine engine component comprising:
    an airflow analysis system operative to:
        receive information, from a first test system, corresponding to a first airflow parameter of a gas turbine engine component, wherein the first test system comprises an airflow test bench;
        receive information, from a second test system, corresponding to the first airflow parameter of the gas turbine engine component; and
        establish a nominal value for the first parameter based, at least in part, on the information from the first test system and the information from the second test system.

15. The system of claim 14, wherein the airflow analysis system is further operative to:
    receive information, from a third test system, corresponding to the first airflow parameter of the gas turbine engine component; and
    adjust the nominal value for the first parameter based, at least in part, on the information from the third test system.

16. The system of claim 14, wherein the first airflow parameter is a volumetric flow rate of cooling air used by the component in operation.

* * * * *